(12) United States Patent
Mendes et al.

(10) Patent No.: US 12,081,492 B2
(45) Date of Patent: Sep. 3, 2024

(54) DIVERSITY CONTROL FOR MULTI-ACCESS WIRELESS NETWORKS

(71) Applicant: Airbus (S.A.S.), Blagnac (FR)

(72) Inventors: Paulo Mendes, Taufkirchen (DE); Thomas Meyerhoff, Hamburg (DE)

(73) Assignee: Airbus (S.A.S.), Blagnac (FR)

( * ) Notice: Subject to any disclaimer, the term of this patent is extended or adjusted under 35 U.S.C. 154(b) by 235 days.

(21) Appl. No.: 17/746,165

(22) Filed: May 17, 2022

(65) Prior Publication Data

US 2022/0376849 A1    Nov. 24, 2022

(30) Foreign Application Priority Data

May 20, 2021 (EP) .................................... 21175007

(51) Int. Cl.
*H04L 5/00* (2006.01)
*H04B 7/024* (2017.01)

(52) U.S. Cl.
CPC ............ *H04L 5/006* (2013.01); *H04B 7/024* (2013.01)

(58) Field of Classification Search
CPC .. H04L 5/006; H04L 1/04; H04L 1/06; H04B 7/024; H04B 7/0891; H04B 7/068; H04W 24/04; H04W 4/42; H04W 72/044
See application file for complete search history.

(56) References Cited

U.S. PATENT DOCUMENTS

| | | | |
|---|---|---|---|
| 2008/0304593 A1 | 12/2008 | Khan et al. | |
| 2009/0202016 A1 | 8/2009 | Seong et al. | |
| 2010/0232532 A1 | 9/2010 | Wu et al. | |
| 2019/0393931 A1* | 12/2019 | Huang | ................. H04B 7/0689 |

OTHER PUBLICATIONS

European Search Report for Application No. 21175007 dated Oct. 27, 2021.

* cited by examiner

*Primary Examiner* — Fred A Casca
(74) *Attorney, Agent, or Firm* — KDW Firm PLLC

(57) ABSTRACT

A network system includes access points and wireless devices. Each wireless device can exchange data with at least one access point that includes a diversity matrix defining at least two data exchange connections between a first wireless device and at least one access point for exchanging data between the first wireless device and the at least one access point. The diversity matrix indicates a space domain with at least one access point, a frequency domain with at least one data transmission frequency value, and a time domain with at least one data transmission time. Each data exchange connection is defined by an access point, a data transmission frequency, and a data transmission time, selected from the diversity matrix. The at least two data exchange connections between the first wireless device and the at least one access point are configured to transmit the same information.

15 Claims, 2 Drawing Sheets

DIVERSITY CONTROL FOR MULTI-ACCESS WIRELESS NETWORKS

CROSS-REFERENCE TO RELATED APPLICATION

This application claims priority to EP 21175007.0 filed May 20, 2021, the entire disclosure of which is incorporated by reference herein.

TECHNICAL FIELD

This subject matter herein relates to the technical field of wireless networks, particularly to the coordination of the communication between access points and wireless devices.

BACKGROUND

Data transmission networks are used in many technical fields to interconnect devices. Different levels of criticality typically require different levels of data transmission reliability.

Reliability in communication systems can be achieved by the retransmission of lost packets (e.g., standard method used in IEEE802.11 networks) or by replicating the transmission of data packets in order to increase the probability of achieving the correct reception and decoding of data. In mission critical systems, packet retransmission should be avoided in order to ensure a low communication delay. The need to avoid packet retransmission arises from the need to reduce communication latencies.

SUMMARY

It may be seen as an object to increase the reliability of a data transmission network, in particular to increase the probability of achieving the correct reception and decoding of data while trying to avoid using a data packet correction or recovery system that may jeopardize the low latency requirements.

This object is solved by the subject matter herein.

A network system is disclosed. Further developments of the disclosure can be derived from the following description.

Many of the features described with reference to the network system may be implemented as method steps, or vice versa. Therefore, the description provided in the context of the network system applies in an analogous manner also to a method.

According to an aspect, a network system comprises a plurality of access points and a plurality of wireless devices. Each of the plurality of wireless devices is configured to exchange data with at least one access point of the plurality of access points. Each access point comprises a diversity matrix that defines at least two data exchange connections between a first wireless device of the plurality of wireless devices and at least one access point of the plurality of access points for exchanging data between the first wireless device and the at least one access point. The diversity matrix indicates a space domain with at least one access point, a frequency domain with at least one data transmission frequency value, and a time domain with at least one data transmission time. Each data exchange connection is defined by an access point, a data transmission frequency value, and a data transmission time, selected from the diversity matrix. The at least two data exchange connections between the first wireless device and the at least one access point are configured to transmit the same information.

The information that is transmitted via two or more data exchange connections does not need to be identical in coding, i.e., it may be transmitted using different codes or different coding schemes. But the information as such is the same. In other words, while the syntax of the transmitted data is different, its semantics is the same.

Thus, the network system described herein enables redundancy in up to three different domains, i.e., space, time, and/or frequency. This redundancy in up to three different domains is achieved by transmitting data via up to two or more access points (redundancy in spatial domain), via up to two or more different data transmission frequency values (redundancy in frequency domain), and via up to two or more different data transmission times (redundancy in time domain). The diversity matrix defines a certain configuration for a data exchange connection and each data exchange connection is assigned a logical connection between an access point and a wireless device, a data transmission frequency value, and a data transmission time. Different data exchange connections may be configured differently, i.e., using different access points, different data transmission frequency values, different data transmission times, for transmitting data between the respective access point(s) and a wireless device.

In other words, the diversity matrix allows to set up multiple data exchange connections (two or more) between wireless devices and access points in such a manner that each data exchange connection can be dynamically (according to needs) configured by selecting one of multiple access points, one of multiple frequency values, and one of multiple data transmission times. The diversity matrix allows that two data exchange connections differ from one another in one, two, or all three domains, i.e., a first data exchange connection may use AP1, f1, t1 while a second data exchange connection uses AP1, f1, t2. In this example, the first and second data exchange connections are different in time domain while they are identical in space domain and frequency domain.

By providing redundancy in up to three different domains (space, frequency, time), the reliability of the network system as a whole is increased because it may withstand malfunctions in the frequency domain (when a certain frequency is subject to interference so that data transmission via this data transmission frequency value is not possible or impaired), the time domain (when data transmission suffers from malfunction at a certain time), and/or spatial domain (when a certain region of the network system experiences malfunctions).

The diversity matrix is used to define the data connection characteristic of the data exchange connection(s) between each of the access points and each of the wireless devices.

According to an embodiment, the at least one of the plurality of wireless devices is configured to exchange data with at least two access points from the plurality of access points. Preferably, the first access point and the second access point are spatially separated from each other, e.g., located at different physical locations.

For example, the access points may be arranged so that a predetermined area is covered with wireless access, i.e., multiple access points are located at regular or irregular distance to enable devices to establish a connection, e.g., a wireless data exchange connection, to one or two access points that are closest to the wireless device.

According to another embodiment, the at least one of the plurality of wireless devices is configured to exchange data by using at least two data transmission frequency values, wherein the at least two data transmission frequency values are different from each other.

Different data transmission frequency values are used to achieve redundancy and enable transmission of data via one of these data transmission frequency values when the other data transmission frequency value is subject to interference, or any other malfunction is present at the other data transmission frequency value.

According to another embodiment, the at least one of the plurality of wireless devices is configured to exchange data by using at least two data transmission times, wherein the at least two data transmission times are different from each other.

The data transmission time is defined by an arbitrary starting point in time and an arbitrary end point in time. The duration between starting point and end point defines the duration that it takes for transmitting the information.

According to another embodiment, a starting time of a first data transmission time of the at least two data transmission times occurs after a starting time of a second data transmission time of the at least two data transmission times, and/or the starting time of the first one of the at least two data transmission times occurs after an end time of the second one of the at least two data transmission times.

Thus, there is a time delay between the starting time of the second data transmission time and the start time of the first data transmission time. Preferably, there is a time delay between the starting time of the second data transmission time and the end time of the first data transmission time, i.e., the second data transmission time starts after the first data transmission time has ended.

According to another embodiment, the diversity matrix is configured to define multiple entries, each of which specifies a data exchange connection between a distinct wireless device of the plurality of wireless devices and a distinct access point of the plurality of access points. Each entry of the multiple entries defines for each data exchange connection, which data transmission frequency value and which data transmission time to use. The network system is configured to change the entry in the diversity matrix based on data transmission characteristics of at least one of the data exchange connections. The data transmission characteristics include at least one of reliability requirements of a data exchange connection, a quality of wireless connectivity between each wireless device and each access point, presence and extent of interference between two or more data exchange connections, or a delay and/or throughput of data via a data exchange connection.

The access points may be configured to detect data transmission characteristics of a data exchange connection. The detected data transmission characteristics are then used to identify a suitable configuration of a data exchange connection, i.e., selecting an access point, selecting a data transmission frequency value, and selecting a data transmission time. Necessary changes to each one of these domains may be identified when the data transmission characteristics fall below a threshold value that is defined for each one of the data transmission characteristics. For example, when the data packet throughput falls below a threshold, a data transmission frequency value and/or a data transmission time and/or an access point used for a data exchange connection to a wireless device may be changed.

According to another embodiment, the reliability requirements are selected from the group consisting of signal to noise ratio, frequency, noise, throughput, packet loss, delay, changes in environment, shadowing, and changes in setup.

According to another embodiment, each access point is configured to monitor the data transmission characteristics of the data exchange connections. Each access point is configured to determine a need for a change to the diversity matrix, based on the monitored data transmission characteristics. The plurality of access points is configured to determine a change to the diversity matrix, based on the data transmission characteristics monitored by at least two access points of the plurality of access points, and generate a changed diversity matrix. The plurality of access points is configured to distribute the changed diversity matrix by using a data synchronization mechanism.

Each access point is configured to gain access to the diversity matrix and determine a need for a change of the diversity matrix based on the detected data transmission characteristics.

The plurality of access points is configured to determine a change to the diversity matrix based on the detected data transmission characteristics of at least two access points of the plurality of access points and generate a changed diversity matrix.

The plurality of access points is configured to distribute the changed diversity matrix by using a data synchronization mechanism. In other words, the individual access points determine a need for a change. When two or more access points determine the same need for a change, the entirety of access points determine an updated diversity matrix and distribute the updated diversity matrix throughout the access points.

Possible data synchronization mechanisms relate to updating the diversity matrix that is stored locally on the access points so that after the synchronization all local instances of the diversity matrix are identical.

According to another embodiment, the network system further comprises a diversity controller, wherein the plurality of access points is configured to transmit the monitored data transmission characteristics to the diversity controller. The diversity controller is configured to determine a change to the diversity matrix, based on the transmitted data transmission characteristics, and generate a changed diversity matrix. The diversity controller is configured to distribute the changed diversity matrix to the plurality of access points. The plurality of access points is configured to replace the diversity matrix with the changed diversity matrix, received from the diversity controller.

In this embodiment, changes to the network system configuration are determined by the diversity controller. The diversity controller receives the detected data transmission characteristics from the access points. Based on the received information, the diversity controller determines necessary and/or useful changes to the diversity matrix and determines an updated diversity matrix that is distributed to the access points. Thus, no synchronization between the access points is needed, as the diversity controller determines and distributes the required changes to the configuration of the network system.

According to another embodiment, the diversity matrix is further configured to create a connectivity matrix based on signal to noise ratio information and/or channel state information. Furthermore, the diversity matrix is configured to eliminate the data exchange connections with a quality below a stipulated threshold and assign each wireless device to at least two access points of the plurality of access points, based on the reliability requirements and traffic KPIs of its applications. Furthermore, the diversity matrix is configured to readjust the assigned data transmission frequency values, and data transmission times in each access point in order to maximize efficiency of spectrum usage (including but not limited to minimizing interference at any stage of data transmission) and couple with performance requirements of each application.

The traffic KPIs may include signal to noise ratio, frequency, noise, throughput, packet loss, delay, changes in environment, shadowing, and changes in setup, stipulated by the network operator.

According to an embodiment, the diversity controller is configured to receive a predetermined connectivity matrix including signal to noise ratio information.

This predetermined connectivity matrix may define the initial configuration of the network system. The predetermined connectivity matrix defines the configuration of the data exchange connections between the access points and the wireless devices by indicating the access point, data transmission frequency value, and data transmission time for each data exchange connection. During operation of the network system, one of these domains (space, frequency, time) may experience malfunction due to several reasons that negatively impact data transmission to a wireless device. The detected data transmission characteristics are transmitted to the diversity controller and the diversity controller may then determine changes to the diversity matrix and re-define the data exchange connections by changing the diversity matrix based on the detected data transmission characteristics.

According to another embodiment, the plurality of access points is interconnected by each other by a wired or wireless network.

The connection between the access points corresponds to a backbone of the network system. The network system is configured to transmit data to and receive data from the wireless devices via the access points. However, the access points as such may process the received data and transmit the received data to a computing device that is connected to the network system in order to further process the data.

The aspects of the network system described herein relate to the connection between the access points and the wireless devices and the way how the connection at this level is managed by the diversity matrix. The network system may be used to transmit and receive any data between devices.

According to an aspect, an aircraft is provided that comprises a network system as described herein. The aircraft may be selected from the group consisting of an airplane, a helicopter, a drone or the like.

The network system may be used in an aircraft to wirelessly interconnect devices located aboard the aircraft. Thus, devices are interconnected with each other in a wireless manner and the number of wired connections is reduced. This may reduce the complexity of wiring harness and may also reduce the total weight of an aircraft. The redundancy mechanisms described above and achieved by using redundancy in up to three different domains (space, frequency, time) can be beneficially used in aircraft technology.

According to a further embodiment, the aircraft comprises a plurality of sensors and actuators which are interconnected by the network system as wireless devices.

Examples for such sensors are smoke detection sensors, temperature sensors, or fuel gauging sensors.

Examples for such actuators are control surfaces, heaters, or lights.

BRIEF DESCRIPTION OF THE DRAWINGS

The subject matter will hereinafter be described in conjunction with the following drawing figures, wherein like numerals denote like elements, and wherein.

DETAILED DESCRIPTION

Figure 1:
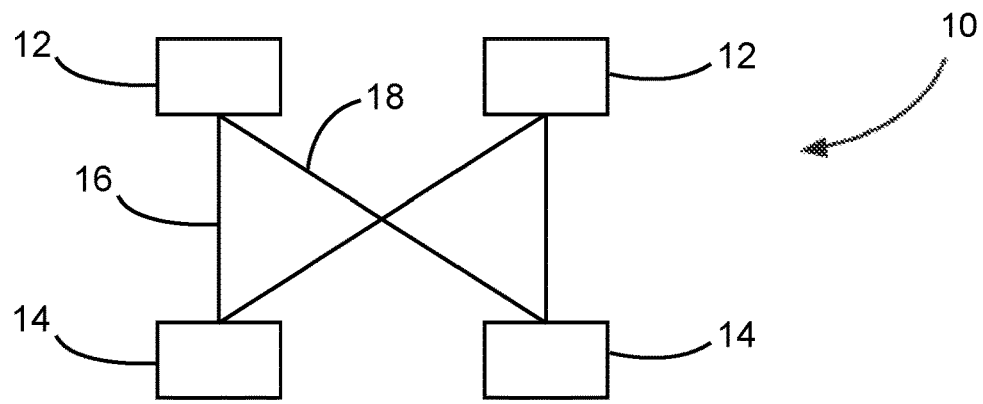
FIG. 1 is a schematic representation of two access points, each interconnected with two wireless devices.

The following detailed description is merely example in nature and is not intended to limit the disclosure herein and uses of the disclosure herein.

Furthermore, there is no intention to be bound by any theory presented in the preceding background or the following detailed description.

The representations and illustrations in the drawings are schematic and not to scale. Like numerals denote like elements.

A greater understanding of the described subject matter may be obtained through a review of the illustrations together with a review of the detailed description that follows.

FIG. 1 shows a schematic representation of two access points 12 interconnected with two wireless devices 14. Each access point 12 comprises a diversity matrix 20 (not shown, see FIG. 3) that defines a data connection characteristic (i.e., the details of the data exchange connections) between the wireless devices 14 and the access points 12. The access points 12 are configured to coordinate the network system 10 by using the diversity matrix 20. The access points 12 are further configured to establish a first data exchange connection 16 and a second data exchange connection 18 between each wireless device and at least one access point 12 for transmitting data between the wireless device 14 and the at least one access point 12. FIG. 1 shows that each wireless device 14 is an end point of two data exchange connections from different access points 12. However, in other embodiments, one wireless device 14 may be interconnected to more than two access points, and/or one wireless device may establish two or more data exchange connections to one access point (via different frequency and/or time domains). The data exchange connections 16, 18 are logical data connections. Each data exchange connection 16, 18 is defined by selecting, from the diversity matrix 20, three values. Each value is from a different domain, so that each data exchange connection 16, 18 is composed of at least three selected values: an access point, a data transmission frequency value, and a data transmission time.

Furthermore, the access points 12 are configured to assign a first data transmission frequency value to the first data exchange connection 16 and a second data transmission frequency value to the second data exchange connection 18, and to assign a first data transmission time to the first data exchange connection 16 and a second data transmission time to the second data exchange connection. Data packets that are transmitted between an access point 12 and a wireless device 14 are then transmitted via the data exchange connection using the assigned data transmission frequency value and the assigned data transmission time. Each wireless device 14 is configured to selectively establish a connection to the two access points 12 by using two different frequencies and transmitting data packets at two different data transmission times.

In the example of FIG. 1, each wireless device 14 establishes two wireless connections to two different access points 12, thereby achieving redundancy in space domain (by having two connections to two different access points), frequency domain (by using two different data transmission frequency values for transmitting data packets via the two data exchange connections), and time domain (by using two different data transmission times for transmitting data packets via the two data exchange connections).

The plurality of access points 12 relay/forward data packets to and receive data packets from the plurality of wireless devices 14. It is assumed that such networks are dense, with access points 12 whose communication ranges overlap. The plurality of wireless devices 14 typically is in communication range of more than one access point 12, so that redundancy in space domain can be achieved.

The plurality of access points 12 is used to form the network system 10 for data transmission in an airborne vehicle, such as an airplane, helicopter, satellite, air taxi, or the like.

The plurality of access points 12 support simultaneous transmissions from and to local wireless devices 14 either downstream or upstream, as is the case for the IEEE 802.11ax standard, for example. The communications between access points 12 and communications between an access point 12 and associated wireless devices 14 can occur simultaneously, which can be achieved, for instance, using techniques similar to those described in the IEEE 802.11ax standard, such as multiple network allocation vectors (NAVs), or spectrum reuse.

The plurality of access points 12 is able to coordinate the usage of available sets of frequencies and data transmission times to transmit and receive data packets from any wireless device 14 that is in range of at least two access points 12. The described network system 10 is able to ensure reliable wireless communications (uplink and downlink) based on the combination of frequency, time and spatial diversity.

Spatial diversity is provided by having two or more access points 12 transmitting data packets to and/or receiving data packets from a wireless device 14. Of course, one access point 12 may establish data exchange connections to more than one wireless devices 14. The two or more access points 12 that are connected to one wireless device may be adjacent or spaced apart from each other.

Frequency diversity is provided by having packets being transmitted via two or more different data transmission frequency values to and from a single wireless device 14.

Time diversity is provided by having packets being transmitted at two or more data transmission times to and from a single wireless device 14.

The plurality of wireless access points 12 is able to provide multi-user parallel access (e.g., OFDMA), and that each wireless device 14 is collocated in the vicinity of at least two access points 12.

While the described system supports either of the three diversity schemes, the support of spatial diversity may have high priority, since the usage of the same wireless channel at distant locations of access points 12 comes with low probability that both locations are affected by the same interference source.

Figure 2:
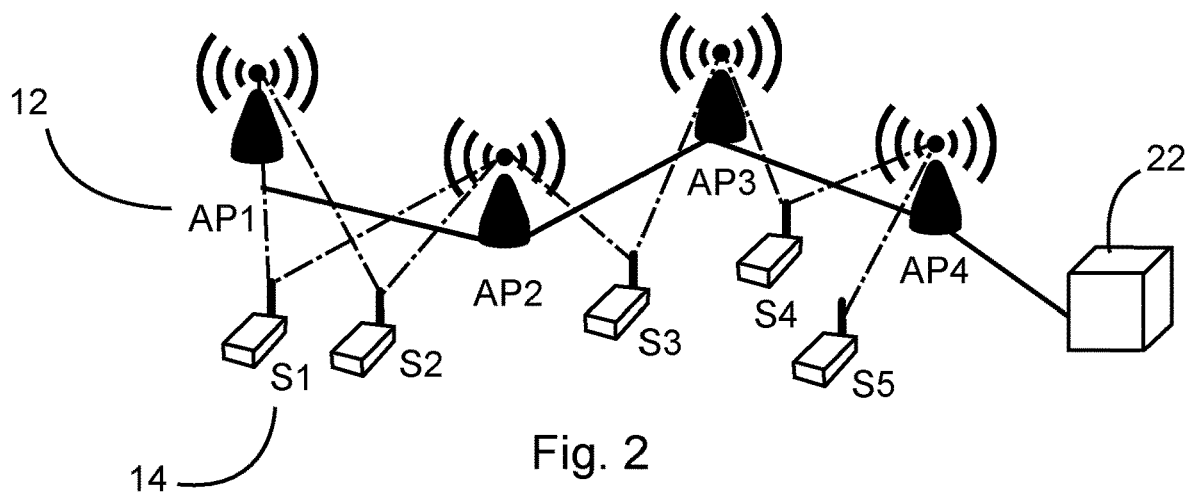
FIG. 2 is a schematic representation of a communication between a diversity controller and a plurality of wireless access points which are connected to a plurality of wireless devices.

FIG. 2 shows a network system with a diversity controller 22 and the plurality of wireless access points 12 in a centralized manner. Alternatively, the communication may occur between the wireless access points only in a distributed manner when the network system does not comprise a diversity controller (this variant is not shown). The communication between the diversity controller and the access points may be done by a specific protocol (e.g., a protocol for data synchronization) via a wired or wireless network. FIG. 2 illustrates the case of a wired network being used for the communication between the diversity controller and a set of access points.

The diversity matrix 20 is created based on a set of contextual information, namely:
  Reliability requirements (higher reliability; higher diversity) of each traffic type transmitted or received by each wireless device 14;
  Quality of wireless connectivity between each wireless device 14 and the plurality of available access points 12 (e.g.: the link budget);
  Maximize efficiency of spectrum usage (e.g. by evaluating the Bit Error Rate or listening to the radio channel for radio signals other than those transmitted by the wireless devices or access points and therefore minimization of interference);
  Keeping the traffic KPIs, such as signal to noise ratio, frequency, noise, throughput, packet loss, delay, changes in environment, shadowing, and changes in setup, stipulated by the network operator.

After collecting information about the traffic requirements of the applications used in each wireless device 14 deployed within the network system 10 as well as the signal to noise ratio and respective link budget of the wireless communication link, the network system 10 (centralized or distributed) starts by:
  Creating a connectivity matrix based on the signal to noise ratio information, eliminating the wireless communication links with quality below a stipulated threshold;
  Assigning each wireless device 14 to at least two access points 12 based on the reliability requirements and traffic KPIs of its applications;
  Readjusting the assigned set of frequencies in each access point 12 in order to maximize efficiency of spectrum usage and couple with the performance requirements of each application (e.g., applications with high throughput requirements are assigned to frequencies in a higher frequency band).

Figure 3:
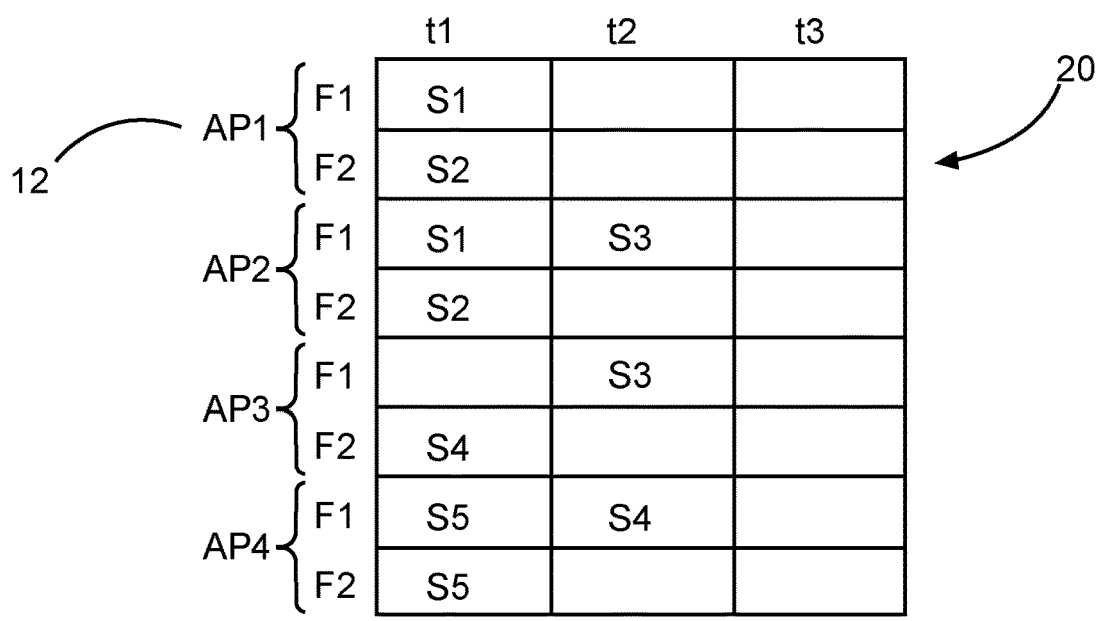
FIG. 3 is a schematic representation of a diversity matrix.

FIG. 3 shows a diversity matrix 20, wherein the described network system 10 allows the plurality of collocated access points 12 to gain access to the diversity matrix 20. The diversity matrix 20 tells each access point 12 which set of frequencies (F1, F2), which access point (AP1, AP2, AP3 or AP4), and which data transmission time (t1, t2, t3) to use for the data exchange connection (uplink and downlink) with which of the wireless devices (S1, S2, S3, S4, S5). In other words, the diversity matrix defines the configuration of the data exchange connections between the access points and the wireless devices, as the three domains (space, time, frequency) are defined for each data exchange connection. It is noted that two data exchange connections are defined for each wireless device with the same information being transmitted via these two data exchange connections. However, in other embodiments. more than two data exchange connections may be defined for each wireless device, which may further increase the level of redundancy.

In a first example, a wireless device S1 establishes two data exchange connections. A first data exchange connection is established between S1 and access point AP1, while a second data exchange connection is established between S1 and AP2 (see fields of S1 in the matrix shown in FIG. 3). The first data exchange connection uses data transmission time t1 and data transmission frequency value F1. The second data exchange connection uses t1 with the data transmission frequency value F1. In this example, spatial diversity is provided (two different access points AP1 and AP2).

In a second example, a wireless device S2 establishes two data exchange connections. A first data exchange connection is established between S2 and access point AP1, while a second data exchange connection is established between S2 and AP2. The first data exchange connection uses data transmission time t1 and data transmission frequency value F2. The second data exchange connection uses t1 with the data transmission frequency value F2. In this example, spatial diversity is provided (two different access points AP1 and AP2).

In a third example, a wireless device S3 establishes two data exchange connections. A first data exchange connection is established between S3 and access point AP2, while a second data exchange connection is established between S3 and AP3. The first data exchange connection uses data transmission time t2 and data transmission frequency value F1. The second data exchange connection uses t2 with the data transmission frequency value F1. In this example, spatial diversity is provided (two different access points AP1 and AP2).

In a fourth example, a wireless device S4 establishes two data exchange connections. A first data exchange connection is established between S4 and access point AP3, while a second data exchange connection is established between S3 and AP4. The first data exchange connection uses data transmission time t1 and data transmission frequency value F2. The second data exchange connection uses t2 with the data transmission frequency value F1. In this example, spatial diversity, frequency diversity and time diversity are provided (two different access points AP3 and AP4, two different frequencies F1 and F2, and two different data transmission times t1 and t2).

In a fifth example, a wireless device S5 establishes two data exchange connections. Both data exchange connections are established between S5 and access point AP4. The first data exchange connection uses data transmission time t1 and data transmission frequency value F1. The second data exchange connection uses t1 with the data transmission frequency value F2. In this example, frequency diversity is provided (two different data transmission frequency values F1 and F2).

While for downstream transmissions each access point 12 will use the information collected in the diversity matrix 20 to configure the downstream frames, for upstream transmissions, each access point 12 uses of the information provided in the diversity matrix 20 to define special control frames (e.g., Trigger frames in IEEE 802.11ax) used to inform each wireless device 14 about the network system 10 used to transmit data to the access point 12.

Figure 4:
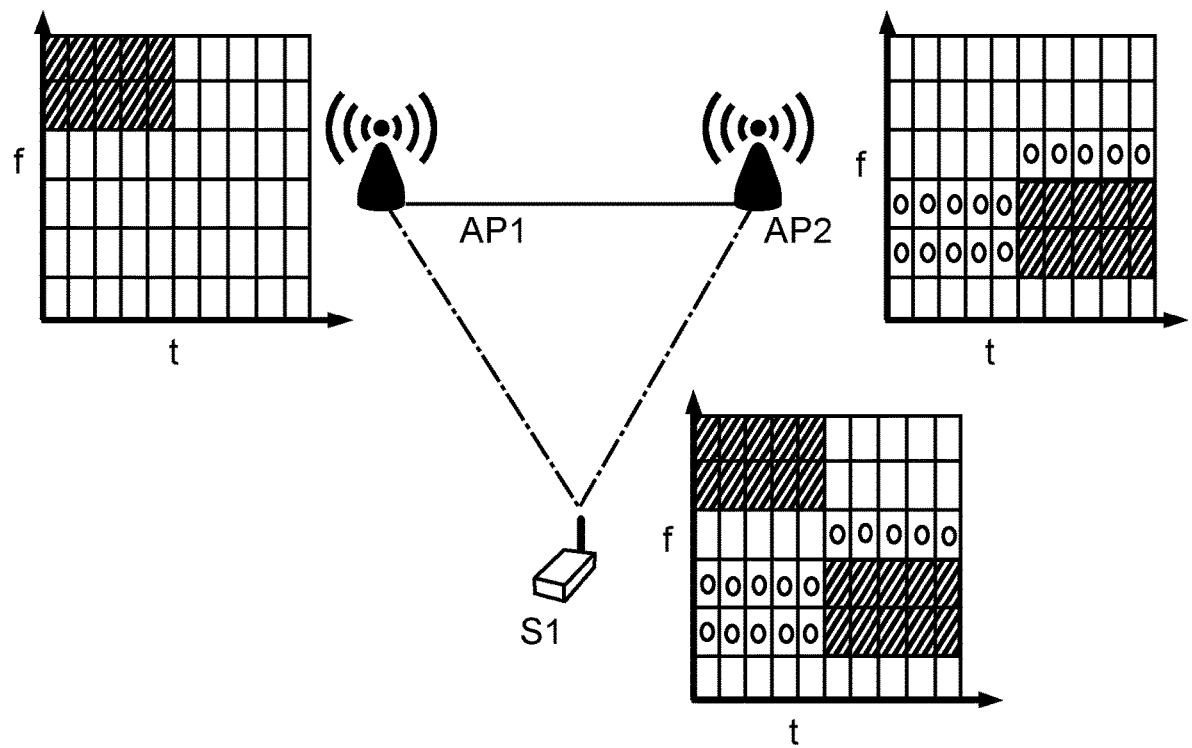
FIG. 4 is a schematic representation of an illustration of a diversity matrix with an implementation of a combination of spatial, frequency, and time diversity.

FIG. 4 shows as one possible result, that the network system 10 can provide spatial diversity, AP1 and AP2, frequency diversity, indicated via the hatched areas, and time diversity, indicated via the blank caskets or caskets containing a circle to any wireless device 14 by creating a diversity matrix 20 such that each wireless device 14 is able to receive/transmit two copies of the same packet in two different frequencies provided by different access points in different data transmission times.

Figure 5:
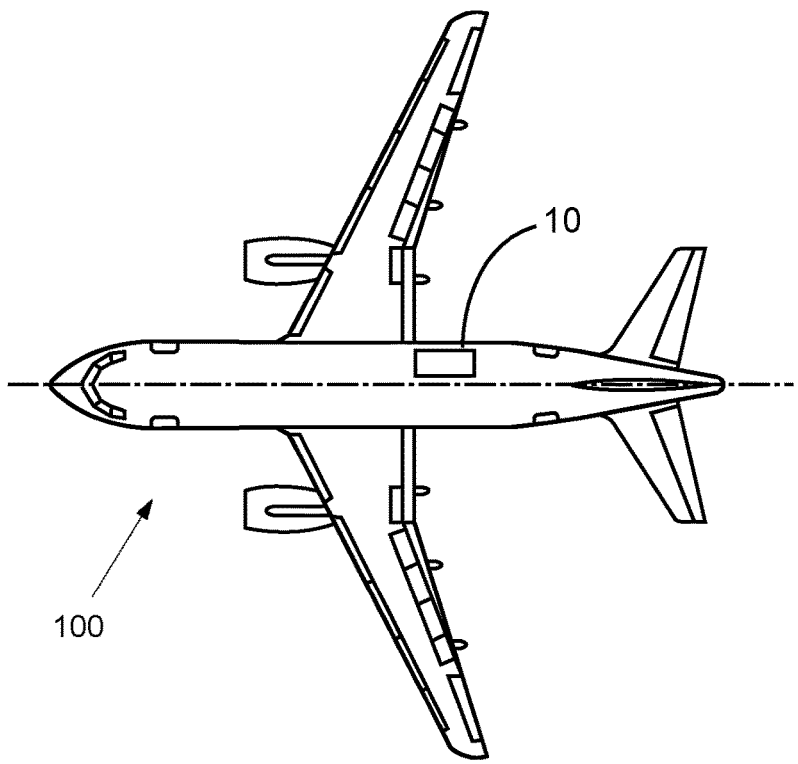
FIG. 5 is a schematic representation of an aircraft comprising a network system.

FIG. 5 shows an aircraft 100 with a network system according to the disclosure herein.

The network system is used in the aircraft to enable data transmission between interconnected devices, e.g., wireless devices like sensors and actuators as described above.

While at least one example embodiment has been presented in the foregoing detailed description, it should be appreciated that a vast number of variations exist. It should also be appreciated that the example embodiment or example embodiments are only examples, and are not intended to limit the scope, applicability, or configuration of the disclosure herein in any way. Rather, the foregoing detailed description will provide those skilled in the art with a convenient road map for implementing an example embodiment of the disclosure herein. It will be understood that various changes may be made in the function and arrangement of elements described in an example embodiment without departing from the scope of the claims.

Additionally, it is noted that "comprising" or "including" does not exclude any other elements or steps and "a" or "an" does not exclude a multitude or plurality. It is further noted that features or steps which are described with reference to one of the above example embodiments may also be used in combination with other features or steps of other example embodiments described above. Reference signs in the claims are not to be construed as a limitation.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 Network system
12 Access points
14 Wireless devices
16 First data exchange connection
18 Second data exchange connection
20 Diversity matrix
22 Diversity controller
100 Aircraft

The invention claimed is:

1. A network system, comprising:
a plurality of access points;
a plurality of wireless devices;
wherein each of the plurality of wireless devices is configured to exchange data with at least one access point of the plurality of access points;
wherein each access point comprises a diversity matrix that defines at least two data exchange connections between a first wireless device of the plurality of wireless devices and at least one access point of the plurality of access points for exchanging data between the first wireless device and the at least one access point;
wherein the diversity matrix indicates a space domain with at least one access point, a frequency domain with at least one data transmission frequency value, and a time domain with at least one data transmission time;
wherein each data exchange connection is defined by an access point, a data transmission frequency, and a data transmission time, selected from the diversity matrix; and
wherein the at least two data exchange connections between the first wireless device and the at least one access point are configured to transmit the same information.

2. The network system according to claim 1, wherein the at least one of the plurality of wireless devices is configured to exchange data with at least two access points from the plurality of access points.

3. The network system according to claim 2, wherein the at least two access points from the plurality of access points are spatially separated from each other.

4. The network system according to claim 1, wherein the at least one of the plurality of wireless devices is configured to exchange data by using at least two data transmission frequency values, wherein the at least two data transmission frequency values are different from each other.

5. The network system according to claim 1, wherein the at least one of the plurality of wireless devices is configured to exchange data by using at least two data transmission times, wherein the at least two data transmission times are different from each other.

6. The network system according to claim 5, wherein a starting time of a first data transmission time of the at least two data transmission times occurs after a starting time of a second data transmission time of the at least two data transmission times; and/or
the starting time of the first one of the at least two data transmission times occurs after an end time of the second one of the at least two data transmission times.

7. The network system according to claim 1, wherein the diversity matrix is configured to define multiple entries, each of which specifies a data exchange connection between a distinct wireless device of the plurality of wireless devices and a distinct access point of the plurality of access points;
wherein each entry of the multiple entries defines for each data exchange connection, which frequency and which data transmission time to use;
wherein the network system is configured to change the entry in the diversity matrix based on data transmission characteristics of at least one of the data exchange connections;
wherein the data transmission characteristics include at least one of:
reliability requirements of a data exchange connection;
a quality of wireless connectivity between each wireless device and each access point;
presence and extent of interference between two or more data exchange connections;
a delay and/or throughput of data via a data exchange connection.

8. The network system according to claim 7, wherein the reliability requirements are selected from the group consisting of signal to noise ratio, frequency, noise, throughput, packet loss, delay, changes in environment, shadowing, and changes in setup.

9. The network system according to claim 7,
wherein each access point is configured to monitor the data transmission characteristics of the data exchange connections;
wherein each access point is configured to determine a need for a change to the diversity matrix, based on the monitored data transmission characteristics;
wherein the plurality of access points is configured to determine a change to the diversity matrix, based on the data transmission characteristics monitored by at least two access points of the plurality of access points, and generate a changed diversity matrix; and
wherein the plurality of access points is configured to distribute the changed diversity matrix by using a data synchronization mechanism.

10. The network system according to claim 7, further comprising a diversity controller;
wherein the plurality of access points is configured to transmit the monitored data transmission characteristics to the diversity controller;
wherein the diversity controller is configured to determine a change to the diversity matrix, based on the transmitted data transmission characteristics, and generate a changed diversity matrix;
wherein the diversity controller is configured to distribute the changed diversity matrix to the plurality of access points; and
wherein the plurality of access points is configured to replace the diversity matrix with the changed diversity matrix, received from the diversity controller.

11. The network system according to claim 1,
wherein the diversity matrix is further configured to:
create a connectivity matrix based on signal to noise ratio information and/or channel state information;
eliminate the data exchange connections with a quality below a stipulated threshold;
assign each wireless device to at least two access points of the plurality of access points, based on reliability requirements and traffic KPIs of its applications;
readjust the assigned data transmission frequency values, and data transmission times in each access point in order to maximize efficiency of spectrum usage and couple with performance requirements of each application.

12. The network system according to claim 11, wherein the diversity controller is configured to receive a predetermined connectivity matrix including signal to noise ratio information.

13. The network system according to claim 1, wherein the plurality of access points are interconnected with each other by a wired or wireless network.

14. An aircraft comprising a network system according to claim 1.

15. The aircraft according to claim 14, wherein the aircraft comprises a plurality of sensors and actuators which are interconnected by the network system as wireless devices.

* * * * *